United States Patent [19]

Boles

[11] Patent Number: 4,637,756

[45] Date of Patent: Jan. 20, 1987

[54] APPARATUS FOR REMOVING AND REPLACING PIPE BENEATH AN EARTHFILL

[76] Inventor: Flounoy W. Boles, P.O. Box 847, East Tallassee, Ala. 36023

[21] Appl. No.: 694,021

[22] Filed: Jan. 23, 1985

[51] Int. Cl.⁴ ............................................... F16L 1/00
[52] U.S. Cl. ................................... 405/184; 405/154; 138/97; 254/29 R
[58] Field of Search ..................... 405/154, 156, 184; 138/97; 254/29 R; 175/53, 62, 22

[56] References Cited

U.S. PATENT DOCUMENTS

| | | | |
|---|---|---|---|
| 2,297,164 | 9/1942 | Rainwater | 254/29 R |
| 3,589,135 | 6/1971 | Ede | 405/184 |
| 4,006,521 | 2/1977 | Pedone | 175/53 X |
| 4,176,985 | 12/1979 | Chermington | 405/154 X |
| 4,249,620 | 2/1981 | Schmidt | 405/184 X |
| 4,422,800 | 12/1983 | Parish | 405/184 |
| 4,507,019 | 3/1985 | Thompson | 405/154 |

Primary Examiner—Cornelius J. Husar
Assistant Examiner—Nancy J. Stodola

[57] ABSTRACT

A method and apparatus for removing faulty or damaged pipe from beneath an earthfill such as a roadway or the like and simultaneously replacing the faulty pipe with a length of new pipe, the invention allows rapid and economic replacement and/or repair of old or damaged plastic or metal piping such as is used as conduits in rural water supply systems and the like. The apparatus includes a length of steel cable having a free end which is pushed through a section of pipe being removed and replaced, the other end of the cable having a threaded adaptor fixed thereto and which is smaller in diameter than the inner diameter of the smallest pipe which would be removed according to the invention. The adaptor is connected to an inner end of a hollow cylindrical replacement member which has an outer diameter greater than the diameter of the pipe being replaced and which is open at the outer end and sized to receive one end of the new pipe which is to be installed, one end of the new pipe being anchored within the displacement member. The inner end of the displacement member abuts the end of the pipe being replaced and pushes that pipe through the earthfill when the cable is pulled through from the opposite side of the fill, the new pipe being thus pulled through the earthfill to replace the pipe being removed. Fluid lubrication apertures in the replacement member facilitate pipe removal and replacement.

15 Claims, 6 Drawing Figures

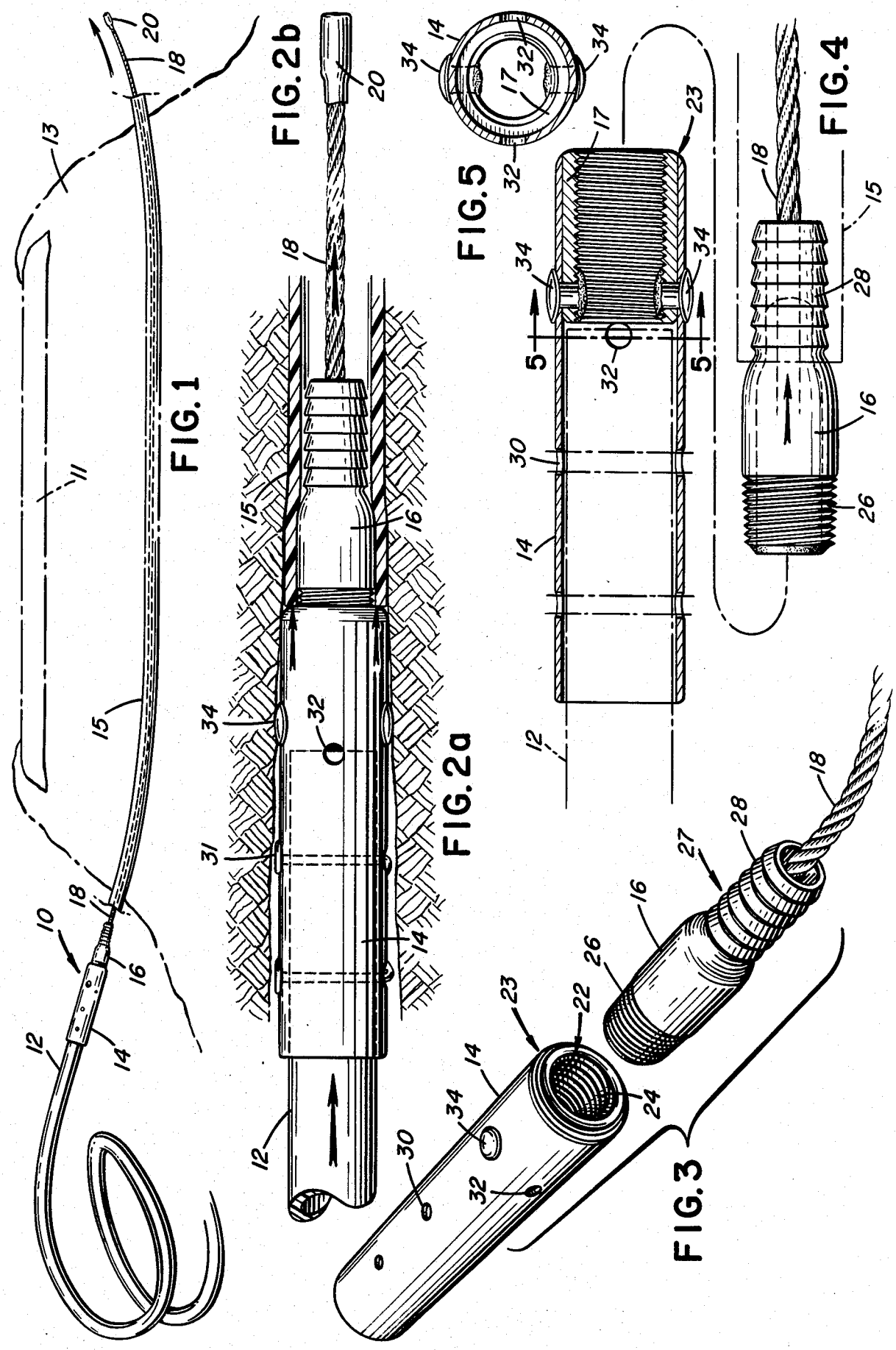

APPARATUS FOR REMOVING AND REPLACING PIPE BENEATH AN EARTHFILL

BACKGROUND OF THE INVENTION

1. Field of the Invention

The invention relates generally to the replacement of piping which passes through earth fills and particularly relates to a method and apparatus for removing and replacing pipe which is imbedded in an earth fill or the like without excavation of the fill.

2. Description of the Prior Art

Rural water service systems have come to use small diameter piping formed of various relatively rigid plastics and metal such as copper, this piping being typically from $\frac{3}{4}''$ diameter to sizes ranging to 2" in diameter and greater. The great majority of the conduit piping or tubing used in such systems for transporting water have diameters of approximately $\frac{3}{4}''$ to 1". This piping or tubing is subject to wear as is any conduit used to transport liquids, it being necessary to replace the piping on a periodic basis. This piping is also subject to damage from a variety of environmental factors, particularly freezing, and is sometimes damaged due to accident. In such situations, it is often necessary to replace at least portions of the piping including pipe portions which pass through earth fills such as roadways and the like. In such circumstances, it has been necessary to excavate the earth fill in order to remove the worn or damaged piping and to replace this piping with new piping, the excavation process being time consuming and laborious whether accomplished manually or with excavation equipment. Even under the best of circumstances, labor and equipment costs cause pipe replacement according to the prior art to be an expensive undertaking. Rural water service systems, in particular, must tolerate substantial expenses due to the need to replace worn or damaged piping.

While the prior art has previously provided methods and apparatus directed to the replacement of old service mains with new pipe structure, the prior art has not provided fully satisfactory methodology and apparatus directed to the particular problems encountered in removing and replacing piping beneath earth fills such as is described above. In U.S. Pat. No. 1,897,561 to Manucci et al, a device is disclosed for replacing an old service main with a new pipe. Pedone, in U.S. Pat. No. 4,006,521, describes a device for removing old pipe and replacing the old pipe with new pipe. Williams, in U.S. Pat. No. 4,309,128 and Parish, in U.S. Pat. No. 4,422,800, describe devices for removing pipe embedded within the earth. The structures disclosed in the foregoing patents, while useful in certain situations in which the use of the devices were intended, do not provide apparatus capable of rapidly and economically removing and replacing flexible piping of the nature of that used in situations such as are encountered in rural water service systems wherein small diameter plastic or metal piping is embedded within earth fills such as under roadways. The devices of the prior art are not directed to structure capable of being rapidly adapted to piping of differing diameters. Further, the devices of the prior art do not provide the ability to lubricate an earth channel from which old pipe is being pulled and new pipe simultaneously placed into the position originally occupied by the old pipe. The present methodology and structure intend solution to the problems encountered in the prior art and provide the ability to rapidly and economically replace and repair old or damaged plastic or metal conduit pipe with a minimum expenditure of time and labor.

SUMMARY OF THE INVENTION

The invention provides method and apparatus for rapidly and economically replacing worn or damaged plastic or metal piping such as is used as conduits to transport liquids such as potable water in rural water service systems and the like, the conduits typically comprising plastic or metal tubing having diameters of approximately $\frac{3}{4}''$ or greater. The apparatus of the invention is particularly useful for removing and placing such tubing when embedded in earth fills such as roadways and the like. In a preferred embodiment, the invention comprises a length of steel cable having a free end which is preferably covered with a short length of copper tubing which is soldered to the end of the cable, thereby to prevent unraveling of the cable. The other end of the length of cable is fitted to a hollow tubular adaptor, the end of the cable being hot leaded in the interior of the adaptor in order to anchor the end of the cable firmly to the adaptor. The adaptor has an outer diameter which is smaller than the inner diameter of the smallest pipe which could be removed from an earth fill according to the invention. The adaptor is provided with male threads at its outer end, these threads connecting to female threads formed within the interior of an inner end of a hollow cylindrical displacement member which is sized to have an outer diameter greater than the diameter of the pipe being replaced. The displacement member is hollow and is open at the outer end and sized to receive one end of the new pipe which is to replace the pipe being removed from the earth fill. Displacement members of several differing sizes can be made available for use as component parts of the present device so that the device has the capability of removing and replacing service tubing or pipes of differing diameter. The outer and open end of the displacement member receives one end of the tubing which is to be installed as the old tubing is being removed, the end of the new tubing being anchored within the displacement member so that the new tubing is pulled into the channel just immediately occupied by the old tubing as the old tubing is being pulled from the earth fill. Pulling force is exerted on the free end of the cable either manually or with the use of a winch or the like so that the adaptor/displacement member combination is pulled through the channel in the earth fill to push the old tubing from the earth fill and pull the new tubing into its place. A pulling force is also exerted on the old tubing in order to facilitate the removal and replacement process. As part of its displacement function, the displacement member abuts the end of the pipe being replaced and pushes that pipe through the earth fill when the cable is pulled from the opposite side of the fill.

The displacement member is provided with at least one water flush and lubrication aperture formed in a side wall of said displacement member, water being flushed through the new pipe which is to be installed and into the displacement member for exit through the aperture in order to lubricate the channel through which the adaptor/displacement member assembly is being pulled, thereby easing the passage of the old and new tubing through the earth fill.

In a further embodiment of the invention, a plurality of flushing apertures can be provided about the periphery of the displacement member and water passed through these apertures in order to enlarge the channel within which the old tubing resided. In this fashion, old tubing of a relatively small diameter can be replaced with tubing of a slightly larger diameter. In order to make this replacement possible, it is desirable to provide a flushing and lubricating action substantially about the full periphery of the displacement member to enlarge the channel through the earth fill by softening of the soil walls of the channel and to flush away portions of said walls.

The displacement member is preferably provided with anchoring apertures toward its outer end, these apertures being used to form holes, such as by drilling, in the end of the new tubing which is inserted into the interior of the displacement member. Connectors such as screws, bolts, rods or the like are then inserted through the apertures in the displacement member and into the aligned holes in the end of the new tubing so as to anchor the tubing within the displacement member. Two sets of aligned anchoring apertures are preferably employed in order to cause the end of the new tubing to be firmly anchored to the displacement member.

Accordingly, it is a primary object of the present invention to provide a method and apparatus for removing faulty or damaged pipe or tubing from beneath an earth fill such as a roadway or the like while simultaneously replacing the faulty pipe with a length of new pipe, thereby to effect rapid and economic replacement of old or damaged plastic or metal pipe or tubing such as is used as conduits in rural water supply systems and the like.

It is another object of the present invention to provide simple and inexpensive apparatus capable of performing a simple and efficient removal and replacement process wherein old service tubing which is worn or damaged is removed from a channel through an earth fill and simultaneously replaced with a length of new service tubing, thereby to avoid the time and expense required for excavation of an earth fill to remove and replace service tubing according to prior practice.

It is yet another object of the present invention to provide a method and apparatus for facilitating the simultaneous removal and replacement of pipe from beneath an earthfill, the apparatus allowing the replacement of a damaged length of pipe with new pipe of either the same or a greater diameter by the provision of a flow of lubricating and/or enlargement fluid into the earthen channel in which the pipe resides.

It is a further object of the present invention to provide method and apparatus capable of removing faulty or damaged service tubing and replacing same with new service tubing of the same or differing diameter, the apparatus of the invention being adaptable to remove and replace service tubing of differing diameters.

It is a still further object of the present invention to provide simple, inexpensive and rugged apparatus capable of rapidly removing and replacing a length of damaged water pipe from an earthfill in order that water service in a rural service system or the like can be restored within a minimum period of time.

Further objects and advantages of the invention will become more readily apparent in light of the following detailed description of the preferred embodiments.

BRIEF DESCRIPTION OF THE DRAWINGS

FIG. 1 is an elevational view taken through an earthfill such as the roadway to illustrate the operation of the present apparatus;

FIGS. 2A and 2B are side elevational views of respective end portions of the present apparatus with a length of damaged pipe being shown in section as said length of damaged pipe is removed from beneath an earthfill;

FIG. 3 is a perspective view of the major elements of the present apparatus shown in assembly positions;

FIG. 4 is a side elevational view of the present apparatus with portions of the apparatus shown in section; and, FIG. 5 is a sectional view taken along lines 5—5 of FIG. 4.

DESCRIPTION OF THE PREFERRED EMBODIMENTS

Referring now to the drawings and particularly to FIG. 1, an earthfill 13 which commonly takes the form of a roadway 11 or the like is seen in section to have a length of service tubing 15 extending beneath the earthfill, the tubing 15 substantially forming and lying within a channel which extends through the earthfill 13. The channel is to be understood to comprise that volume or passageway within which the service tubing 15 lies, the channel having earthen or soil walls and would, in the absence of the service tubing 15, fill in and become a solid part of the earthfill 13. The service tubing 15 essentially comprises either plastic or metal tubing such as is commonly used in rural water service systems as a conduit for potable or other water transport. The service tubing 15 can be formed of copper pipe or of "plastic" material and typically is of a diameter of between $\frac{3}{4}''$ and 2'' although these dimensions may vary. The service tubing 15 typically has a pressure rating of approximately 250 psi and a suitable plastic tubing is rated at ASTM D2666. Such tubing is commonly used in a variety of applications for liquid transport and in a large number of such applications, the tubing is disposed under ground and commonly passes through an earth fill such as the earth fill 13. Herein, the service tubing 15 is referred to as pipe, piping, conduit, tubing, etc., these designations essentially referring to the same service tubing as now described.

The service tubing 15 is subject to wear and damage such as may be accidental or due to the elements, particularly low temperatures which cause freezing and attendant bursting of the service tubing 15. Damage to the tubing 15, such as through freezing, results in the need to rapidly replace the service tubing 15 in order to restore water to dwellings and the like. Unfortunately, particularly cold weather usually results in a number of instances of damaged tubing, particularly where such tubing goes through earth fills, thereby presenting the usual rural water service system with the problem of replacing a number of sections of service tubing within a short period of time in order to restore full service. Excavation of the earth fill 13 is seen to be both labor intensive and equipment intensive and is further time consuming, thereby preventing the work force typically available from readily and rapidly accomplishing a restoration of full water service to all users.

As seen in FIG. 1, however, a damaged section of the service tubing 15 is seen to be efficiently removed from the earthfill 13 and replaced through use of a pipe removal and replacement device 10 configured according to the present invention. In use of the device 10, the service tubing 15 is cut on each side of the earthfill 13 to leave the section having a damaged portion. A free end 20 of a flexible roll of partially rigid cable 18 is inserted into the section and pushed through the full length of the section. The opposite end of the cable 18 is joined to the particular structure of the invention which also connects to the end of a new length of new service tubing 12 which is to replace the section of the used tubing 15. By grasping the free end 20 of the cable 18, either manually or with appropriate winch equipment, the cable 18 is pulled and the device 10 displaces the section from within the channel while pulling a length of the new service tubing 12 through the channel. Removal of the used section of the tubing 15 is facilitated by also pulling on the end of the tubing 15 in addition to the pulling force exerted on the cable 18. Accordingly, the old section of the service tubing 15 is removed from the earthfill 13 at the same time as a length of the new service tubing 12 is pulled into the channel. The new service tubing 12 now occupying the channel in the fill 13 is connected to remaining portions of the service tubing previously connected to the tubing 15 by couplings (not shown) in order that service be restored.

Referring now to FIGS. 1 and 2B, a typical embodiment of the device 10 is illustrated. The cable 18 is preferably shown to have a short length of copper tubing soldered or crimped to the free end 20 in order to provide structural rigidity and, in the case of braided or coiled steel cables, to prevent fraying of the end 20 of the cable 18. The weight provided by the small section of the copper tubing further provides some additional assistance in threading the cable 18 through the used section of the tubing 15 as is described above. The cable 18 is typically chosen to be steel cable which would be of approximately 3/16" diameter and which would have sufficient tensile strength to accommodate the pulling forces which are exerted through the cable 18 as aforesaid. In order to accommodate typical tubing removal and replacement situations, it is preferred that the cable 18 have a length of approximately 40 feet.

At the end of the cable 18 opposite said free end 20, an adaptor member or fitting 27 is connected such as by "hot leading" to anchor the adaptor member 27 to the end of the cable 18. The adaptor member 27 typically comprises a cylindrical body portion 16 at an outer end and a reduced-in-diameter shank portion 28, the adaptor member 27 being hollow and having an interior cavity which is substantially the same shape as the outer shape of said adaptor member 27. Attachment of the cable 18 within the interior cavity of the adaptor member 27 by a process such as the "hot leading" process firmly and securely anchors the adaptor member 27 to the end of the cable 18 in a manner sufficient to resist the pulling forces which are exerted on the adaptor member 27 through the cable 18 in the process of removal and replacement of the service tubing 15. The shape of the interior cavity with a reduced diameter portion interiorly of the shank portion 28 adds additional strength and resistance to a pulling out of the end of the cable 18 from the adaptor member 27.

External threads 26 are provided on outer surfaces of the cylindrical body portion 16 of the adaptor member 27 to form a male connector at the end of the adaptor member 27. The threads 26 mate with internal threads 24 which are formed on inner surfaces of coupling member 17, the coupling member 17 being received within a first end of a displacement member 14 which is substantially cylindrical in conformation. The coupling member 17 can be received within one end of the hollow displacement member 14 and mounted therein such as by rivets 34. The coupling member 17 has rounded annular portions 23 which mate flushly peripherally with outer surfaces of the displacement member 14. As is noted in FIGS. 2A and 4, the displacement member 14 is further provided with two pairs of aligned anchor apertures 30 which are spaced along the length of said displacement member 14 and spaced from the coupling member 17. The function of the apertures 30 will be described hereinafter. Further, at least one flushing aperture 32 is formed in the displacement member 14 at a location between that pair of aligned anchor apertures 30 nearmost the coupling member 17 and the innermost end of the coupling member 17. The function of the flushing aperture 32 will also be described further hereinafter.

In use, the threads 26 on the adaptor member 27 are mated with the threads 24 within the interior of the displacement member 14 in order to solidly attach the adaptor member 27 to the displacement member 14. The outer diameter of the cylindrical body portion 16 of the adaptor member 27 is sized to fit within and pass through the smallest diameter service tubing which is intended for use with the device 10. The displacement member 14, on the other hand, takes the form of a plurality of individual members 14 having differing outer diameters but wherein the coupling member 17 of each of said differing diameter displacement members 14 being of an inner diameter at the location of the threads 24 such that the adaptor member 27 can be connected to the displacement members 14 of varying size. As an example, when the service tubing 15 which is to be removed from the earthfill 13 has an outer diameter of ¾", a common size, the outer diameter of the displacement member 14 is chosen to be 1" such that exposed edges of the used section of tubing 15 which abut the rounded annular portions 23 carried on the displacement member 14 allow a pushing of the used section of tubing 15 when the cable 18 is pulled therethrough, thereby further facilitating the removal of the used section from the earthfill 13 as aforesaid, the section of tubing 15 is also pulled from that end at which a pulling force is also exerted on the cable 18 in order to further assist in the removal of the used section from the earthfill 13. When removing service tubine 15 of greater diameter, a displacement member 14 of correspondingly greater diameter is employed. It is to be noted that the coupling member 17 can be connected to the displacement member 14 through connectors other than the rivets 34 as shown. For example, outer surfaces of the coupling member 17 could be provided with threads (not shown) which could mate with threads (not shown) on inner wall surfaces of the displacement member 14 in order to firmly connect the coupling member 17 inside of the displacement member 14. As an alternative, the coupling member 17 could constitute a threaded portion (not shown) formed integrally at the inner end of the displacement member 14 for mating with the threads 26 on the adaptor member 27. In other words, the coupling member 17 and the displacement member 14 can be integrally formed. However, the structure of the displacement member 14 and the coupling member 17 as shown is easily manufactured and is therefore chosen for illustration.

The anchor apertures 30 are seen to be aligned in pairs and are used as a guide for a drill or a piercing instrument to form aligned anchor holes in the end of the new service tubing 12 which is received within the outer end of the displacement member 14, this connection being best seen in FIG. 2A. On formation of the anchor holes in the end of the new service tubing 12, connectors 31 such as screws, bolts, rods or the like are used to connect the end of the new service tubing 12 to the displacement member 14, this connection being preferably made at at least two locations such as is illustrated in order to securely hold the new service tubing to the displacement member 14. Since the end of the new service tubing 12 is actually contained within the interior of the displacement member 14, a reduced resisting force is exerted on the new service tubing 12 relative to that force which is exerted on the displacement member 14 since outer surfaces of the displacement member 14 effectively provide the major contact with the earthen walls of the channel formed through the earthfill 13. Substantial force is thus not exerted on the new service tubing 12, thereby preventing damage thereto.

In order to lubricate the channel as necessary, the flush aperture 32 is provided in a side wall of the displacement member 14. The flush aperture 32 is located near the innermost end of the coupling member 17 and spaced from the innermost of the anchor apertures 30 so that the end of the new service tubing 12 does not block the flush aperture 32, the end of the new service tubing 12 preferably being located in order to stop short of the location of the aperture 32. Water or other liquid can be caused to flow through the new service tubing 12 and out of the flush aperture 32 in order to facilitate movement of the device 10 through the earthfill 13. It is to be noted that a plurality of the flush apertures 32 can be provided for this purpose.

According to a preferred embodiment of the invention, a plurality of the flush apertures 32 are provided about the periphery of the displacement member 14 in order to wet the earthen walls of the channel over substantially the full surfaces thereof. In certain situations, this complete wetting can be used for purposes of lubricity. However, it is to be noted that the direction of a substantial flow of water or other liquid through the new service tubing 12 and out of the plurality of the flush apertures 32 can cause walls of the channel to be enlarged in order to facilitate replacement of the used section of tubing 15 as noted in FIG. 1 with new service tubing which is of a diameter slightly greater than the diameter of the service tubing 15 being replaced. When so used, the displacement member 14 is sized in order to accommodate the appropriate diameter of new service tubing within its open end for attachment through the anchor apertures 30 as aforesaid. As has been noted above, the adapter member 27 can be used with displacement members 14 of differing diameter since the threaded coupling member 17 in each of these different size displacement members 14 is chosen to have threads 14 within a standard size hole 22 which is of a diameter which will mate with the threads 26 of the adaptor member 27. While the hole 22 having the female threaded portion 24 formed therein in the coupling element 17 would remain a given size, the outer diameter of the coupling element 17 can be altered in order to fit properly within a given size for the housing conduit 14.

It is to be understood that the apparatus 10 of the invention can be used with pipe formed of different materails, such as copper and the like, as well as being used with the commonly employed plastic pipe. Further, the apparatus 10 can be configured other than as explicitly described above without departing from the intent of the invention. Accordingly, the scope of the invention is to be interpreted in light of the definitions provided by the appended claims.

What is claimed is:

1. Apparatus for simultaneously removing and replacing a section of service tubing or pipe embedded in an earth fill, the apparatus being capable of removing and replacing service tubing or pipe of varying diameter, comprising:

a length of cable having a free end and an inner end;

an adapter member connected tothe inner end of the cable and being of a diameter less than that of the smallest diameter section of service tubing which is to be replaced;

a plurality of displacement members of substantially cylindrical conformation, each of said displacement members having a differing outer diameter which is greater than at least the inner diameter of the service tubing which is to be replaced by each said displacement member, the displacement members each being hollow to form a longitudinally disposed interior channel, each of said channels having an inner diameter which is greater than the outer diameter of the service tubing which is to be installed by each said displacement member, each of the displacement members having abutment surfaces on one end for abutting against the end of the section of service tubing which is to be replaced;

means on the adaptor means and on each of the displacement members for releasably connecting the adaptor member to the displacement member, each of the plurality of displacement members being connectible to the one adaptor member; and, means carried by each of the displacement members for connecting a free end of the service tubing which is to be installed to the displacement member, whereby respective displacement members can be substituted for within the apparatus by ready and rapid disconnection of any one of the displacement members from the adaptor member and replacement on the adaptor member with a different sized displacement member to allow service tubing of different sizes to be removed and replaced.

2. The apparatus of claim 1 and further comprising a portion of metal tubing attached to the free end of the cable.

3. The apparatus of claim 1 wherein the adaptor member comprises a casing member which has a first cylindrical portion and a reduced-in-diameter shank portion, the said portions defining a similarly shaped internal cavity, the inner end of the cable being received within the reduced-in-diameter portion and extending substantially through the interior of the casing member, and means filling the internal cavity for fixing the adaptor member to the inner end of the cable.

4. The apparatus of claim 3 wherein the fixing means comprise solidified lead applied by a hot lead process.

5. The apparatus of claim 1 wherein the connecting means comprise an externally threaded portion formed on the outermost end of the adaptor member and an internally threaded portion formed at the end of the displacement member at which the abutment surfaces are formed, the threaded portions mating to connect the adaptor member to the displacement member.

6. The apparatus of claim 1 wherein the last-mentioned means comprise at least one pair of aligned anchor apertures formed in each of the displacement members, the aligned anchor apertures being used as a guide for formation of apertures in the free end of the service tubing which is to be installed and which align with the anchor apertures, and connection means received through the anchor apertures and the apertures in the service tubing for connecting the tubing to the displacement member.

7. The apparatus of claim 6 wherein the free end of the service tubing is received within the open, outer end of the displacement member.

8. The apparatus of claim 6 wherein the connection means comprise screws, bolts, rods or pins.

9. The apparatus of claim 1 wherein at least one flush aperture is formed in each of the displacement members at a location unblocked by the connection of the displacement member to the free end of the service tubing which is to be installed, whereby a flow of lubricating liquid can be directed through the service tubing which is to be installed and into the displacement member, the liquid flowing out of the flush aperture to contact portions of the earth fill displaced by the section of service tubing to thereby provide lubrication.

10. The apparatus of claim 1 wherein a plurality of flush apertures are formed substantially regularly about the periphery of each of the displacement members at locations unblocked by the connection of the displacement member to the free end of the service tubing which is to be installed whereby a flow of liquid can be directed through the service tubing which is to be installed and into the displacement member, the liquid flowing out of the apertures to contact and enlarge portions of the earth fill displaced by the section of service tubing to facilitate replacement of the section of service tubing with service tubing of a greater diameter.

11. Apparatus for removing a section of used pipe from beneath an earth fill and simultaneously replacing the pipe with a new pipe, the apparatus being capable of removing and replacing pipe of varying diameter, comprising:

a plurality of housing conduits of substantially cylindrical conformation, each having a longitudinal channel extending therethrough, the housing conduits being of differing outer diameter for replacement of pipe of differing inner diameter, the respective inner diameters of the housing conduits being greater than the outer diameters of the new pipe which is to be replaced by each said housing conduit, each housing conduit receiving one end of the new pipe into an end of the conduit, the conduit having holes formed therein to align with holes formed in the end of the new pipe;

connector means received within the holes in each of the housing conduits and in the new pipe for connecting the new pipe to the housing conduits;

a cable having a free end capable of being passed through the interior of the used pipe; and, means for connecting the cable to the housing conduit, comprising an adaptor fitting connected to the inner end of the cable and having a male threaded portion at its free end, the adaptor fitting having a greatest outer diameter which is less than the outer diameter of the housing conduits and less than the inner diameter of the lowest diameter pipe which is to be replaced, and a coupling element received within the end of each of the housing conduits opposite that end receiving the new pipe and being connected to the housing conduit, the coupling element having a channel formed longitudinally therein and being threaded to receive the male threaded portion of the adaptor fitting, thereby to releasably connect the adaptor fitting to each of the housing conduits, the plurality of the housing conduits being readily and rapidly connectible to and disconnected from the adaptor fitting to allow pipe of differing diameter to be efficiently removed and replaced.

12. The apparatus of claim 10 wherein each of the housing conduits has at least one lubrication hole formed therein to allow flow of a lubricating fluid such as water to the portion of the earthfill surrounding the pipe, the water being directed into the apparatus through the new pipe.

13. The apparatus of claim 12 wherein a plurality of lubricating holes are formed about the periphery of each of the housing conduits the lubricating holes providing a flow of water sufficient to enlarge the channel within the earthfill.

14. The apparatus of claim 11 wherein each of the coupling elements has a rounded peripheral portion extending from the housing conduit within which said coupling element is mounted, the round peripheral portion engaging the end of the section of used pipe to provide an abutment surface which pushes against an end of the used pipe on drawing of the cable through the used pipe.

15. The apparatus of claim 11 wherein the adaptor fitting is hollow and comprises a primary body portion and a reduced-in-diameter neck portion, the inner end of the cable being received into the neck and extending into the interior of the body portion, the end of the cable being locked within the interior of the adaptor fitting by fused metal filling the interior of said fitting.

* * * * *